Feb. 2, 1971 W. HRYNISZAK 3,559,403
THERMAL POWER PLANT HAVING HEAT FLOW CONTROL MEANS
RESPONSIVE TO AMBIENT TEMPERATURE
Filed Jan. 2, 1969
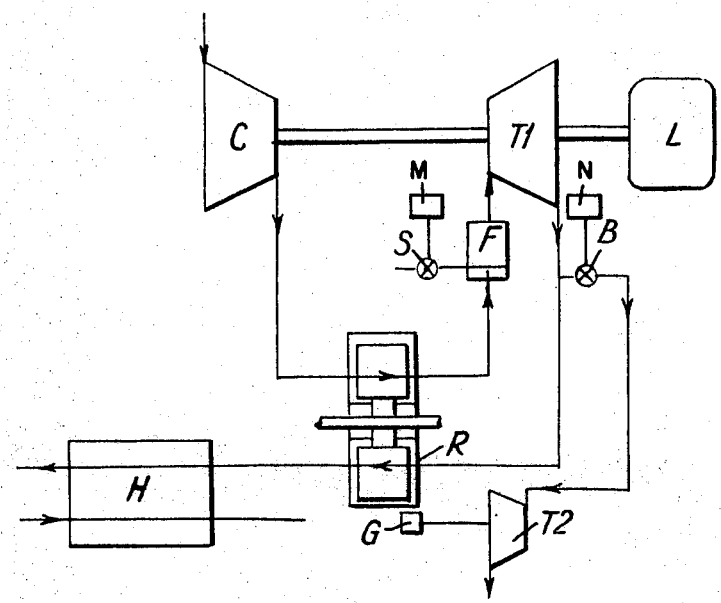
Inventor
Waldemar Hryniszak
His Attorneys United States Patent Office 3,559,403
Patented Feb. 2, 1971

3,559,403
THERMAL POWER PLANT HAVING HEAT FLOW CONTROL MEANS RESPONSIVE TO AMBIENT TEMPERATURE
Waldemar Hryniszak, Cullercoats, North Shields, England, assignor to Clarke Chapman & Co. Limited, Gateshead, Durham County, England, a company of Great Britain and Northern Ireland
Filed Jan. 2, 1969, Ser. No. 788,459
Int. Cl. F02c 7/10
U.S. Cl. 60—39.15            5 Claims

ABSTRACT OF THE DISCLOSURE

The specification describes a thermal power plant in which combustion products form the working fluid in a turbine working stage and are then directed through a rotary regenerator to preheat combustion air. The speed of the regenerator is regulated by temperature-sensitive means to vary the rate of heat transfer between the turbine exhaust flow and the incoming combustion air flow so that the heat flow to the working stage can be controlled thereby in dependence upon changes in ambient temperature. The supply of fuel may also be subject to temperature control so that it is varied together with the degree of preheat.

---

This invention relates to thermal power generation plant.

To cater for changes in the energy output required from a thermal power plant it is usual to vary the rate of heat generation through control of the primary fuel supply. Adjustment of the fuel supply is also used to govern the output if this is to be kept constant when other conditions vary. There is the disadvantage, however, that the efficiency of operation of the plant will be reduced as the combustion process conditions deviate from an optimum with variation of the rate of fuel supply.

The present invention is concerned with providing means whereby the decrease in efficiency over a range of operating conditions can be reduced and according to the invention, in a power plant having means for the recovery of energy from the exhaust or waste heat of the working stage of the thermal cycle by use of a heat regeneration device, there are now arranged means to control the working fluid energy supply to the working stage by varying the rate of heat transfer in said regeneration device in dependence upon the ambient temperature.

The invention may be employed to maintain a constant output from the plant, independently of variations in the ambient temperature. Alternatively, in many applications of power generation, the rate of power supply required will vary with ambient temperature, less power being required when this temperature rises and vice versa, and a plant according to the invention may be arranged to have the rate of heat transfer in the regeneration device controlled to give a power output characteristic of this form.

A thermal power plant according to the invention may include a rotary regenerator wherein heat is transferred to air for combustion from the exhaust combustion product gases of a working stage, and means may then be provided to vary the rotational speed of the regenerator, and thereby the degree of heat transfer, on the assumption that the quantity of work (e.g. of generation of electric current) required from the power plant varies in a calculable inverse ratio to ambient temperature.

Where a rotary regenerator is used in this manner, it is possible to increase particularly part-load efficiencies as compared with known power plant in which the rotational speed of the regenerator is related directly to that of an output turbine forming the working stage of the plant.

Such a rotary regenerator may for example be driven by a proportion of the exhaust gases diverted to a suitable motive unit from a duct between the exhaust of the working stage and the heating side of the regenerator, the quantity being increased, so as to accelerate the rotation of the regenerator and thereby increase the rate of heat transfer, by regulating means responsive to decrease of atmospheric temperature, and vice versa. Thereby, the temperature of air for combustion is varied, and consequently the temperature and volume of combustion products available for the working stage is likewise varied.

Depending upon the power output required from the plant and the maximum permissible inlet temperature of the working stage, variation of the rate of fuel combustion will generally be required as the rate of heat regeneration changes. It is a preferred feature of the invention that the control of the fuel supply should include means responsive to ambient temperature so that combustion conditions can be maintained at an optimum, in conjunction with the variation in the combustion air flow from the regeneration device, for the required power output characteristic of the plant.

One example of a thermal power plant according to the invention will now be described by way of example with reference to the accompanying diagrammatic drawing.

Referring to the drawing, a gas turbine T1 serving as the working stage of the power plant thermal cycle, is shaft-coupled to a turbine compressor C for combustion air, and to an electrical generator L. The air issuing from the compressor C and the exhaust gases from the turbine are passed through opposite sides of a rotary regenerator R, to recover some of the heat of the exhaust gases by transfer to the combustion air. The preheated air then flows to a burner F for a primary fuel, such as natural gas, and the burner combustion products pass as working fluid to the turbine T1.

The fuel gas supply is regulated by means M including a valve S that has governing means responsive to ambient temperature. By matching the delivery characteristic of the valve with the temperature characteristic of the combustion air from the regenerator R, which also varies with ambient temperature, the relationship of the turbine inlet temperature to the ambient temperature can be controlled to the required pattern while the combustion conditions are optimised over the expected range of operation. In effect, the control of the degree of preheating of the combustion air will mean that a smaller variation of fuel supply rate will be needed to maintain a required power output characteristic over a range of ambient temperatures. It will be appreciated that further controls may be required for the fuel supply but these will be of a conventional nature, e.g. to set the maximum turbine inlet temperature and to govern the power output from the plant.

The regenerator R may be driven by any suitable engine or motor. In the illustrated example it is driven by an auxiliary turbine T2 through reduction gearing G, and said turbine T2 is supplied with a proportion of the exhaust gases from the turbine T1, the supply being regulated by a valve B also having control means N responsive to ambient temperature. The control characteristic is such that the speed of rotation of the regenerator R increases as the temperature falls, or decreases as the temperature rises, and if desired it may also provide a lag over a "normal" temperature range.

The partly cooled exhaust gases issuing from the regenerator are shown passing through a heat exchanger H for further heat recovery, for example, by transfer to a hot water system.

It is to be understood that references to the working stage of the thermal cycle do not necessarily mean that this part of the cycle is performed in a single unit of the power plant and it is possible that work is done by the fluid in a number of discrete steps within the working stage, e.g. by passing through a series of turbines. Also, while the rotary regenerator in the drawing is shown to have a revolving drum, this could be held stationary while the co-acting inlet and outlet hoods rotate, as is conventional in very large units.

What I claim and desire to secure by Letters Patent is:

1. A thermal power plant comprising, in combination, means generating a heated flow of working fluid, which supplies working energy;

a working stage connected to said means to receive said heated flow and having an exhaust fluid flow;

a rotary heat generating device connected to said working stage to receive said exhaust fluid flow therefrom;

means directing an input fluid flow through said rotary heat regeneration device to transfer heat from said exhaust flow to said heated flow;

drive means for said rotary regeneration device; and a control device for said drive means for controlling the rotational speed of said rotary heat regeneration device in dependence upon a change in the ambient temperature for varying the rate of heat transfer in said rotary heat regeneration device and for controlling the working energy supplied by said working fluid.

2. A thermal power plant according to claim 1 wherein said drive means comprises a fluid-powered device, connection means from the working stage to said device being arranged to lead exhaust fluid from the working stage to power said device, said temperature-sensitive control device including a valve in said connection means to vary the power input to the drive means in dependence upon ambient temperature.

3. A thermal power plant according to claim 1 wherein said means generating a heated flow of fluid comprises a combustion chamber and a fuel supply route thereto, said input fluid flow from the regeneration device being a combustion air flow for the fuel and conduit means for the products of combustion being connected to the working stage so that said products form the working fluid in said stage.

4. A thermal power plant according to claim 1 wherein said means generating a heated flow of fluid comprises a combustion chamber and a fuel supply route thereto, regulating means in said route comprising a device sensitive to ambient temperature to control the rate of fuel flow to the chamber in dependence to said temperature.

5. A thermal power plant according to claim 1 further comprising heat exchange means disposed in the path of the exhaust flow from the regeneration device and arranged to extract heat from said exhaust flow.

References Cited
UNITED STATES PATENTS

| | | | |
|---|---|---|---|
| 2,960,825 | 11/1960 | Sampietro et al. | 60—39.51 |
| 2,971,339 | 2/1961 | Gold et al. | 60—39.51X |
| 3,166,902 | 1/1965 | Maljanian et al. | 60—39.51X |

DOUGLAS HART, Primary Examiner

U.S. Cl. X.R.

60—39.51